(12) United States Patent
Nirjon et al.

(10) Patent No.: US 10,310,632 B2
(45) Date of Patent: Jun. 4, 2019

(54) WEARABLE DEVICES FOR DETECTING FINGER MOVEMENTS AND RELATED METHODS

(71) Applicant: HEWLETT-PACKARD DEVELOPMENT COMPANY, L.P., Houston, TX (US)

(72) Inventors: S M Shahriar Nirjon, Palo Alto, CA (US); Kyu Han Kim, Palo Alto, CA (US); Jeremy Gummeson, Palo Alto, CA (US); Daniel Gelb, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/535,815

(22) PCT Filed: Feb. 27, 2015

(86) PCT No.: PCT/US2015/018149
§ 371 (c)(1),
(2) Date: Jun. 14, 2017

(87) PCT Pub. No.: WO2016/137514
PCT Pub. Date: Sep. 1, 2016

(65) Prior Publication Data
US 2017/0351345 A1 Dec. 7, 2017

(51) Int. Cl.
*G06F 3/0346* (2013.01)
*G06F 3/01* (2006.01)
(Continued)

(52) U.S. Cl.
CPC ............ *G06F 3/0346* (2013.01); *G06F 3/014* (2013.01); *G06F 3/017* (2013.01); *G06F 3/0236* (2013.01);
(Continued)

(58) Field of Classification Search
CPC ................. G06F 2203/0331; G06F 2203/0384
See application file for complete search history.

(56) References Cited

U.S. PATENT DOCUMENTS

| 5,581,484 A | 12/1996 | Prince |
| 6,748,281 B2 | 6/2004 | Alsio |

(Continued)

FOREIGN PATENT DOCUMENTS

| JP | 2008509488 A | 3/2008 |
| TW | 201224859 A | 6/2012 |
| TW | 201426402 A | 7/2014 |

OTHER PUBLICATIONS

Howard, B et al, "Lightglove: Wrist-worn Virtual Typing and Pointing" 2001.
(Continued)

*Primary Examiner* — Chun-Nan Lin
(74) *Attorney, Agent, or Firm* — HPI Patent Department

(57) ABSTRACT

Examples relate to determining finger movements. In one example, a computing device may: receive input from at least one of: a first proximity sensor coupled to the frame at a first position and facing a first direction; or a second proximity sensor coupled to the frame at a second position and facing a second direction; determine, based on the input, that a finger action occurred, the finger action being one of: a first movement of a first finger, the first movement being detected by the first proximity sensor; a second movement of a second finger, the second movement being detected by the second proximity sensor; generate, based on the finger action, output that includes data defining an event that corresponds to the finger action; and provide the output to another computing device.

20 Claims, 9 Drawing Sheets

(51) Int. Cl.
*G06F 3/023* (2006.01)
*G06F 3/042* (2006.01)
*G06F 3/0488* (2013.01)
*G06F 3/038* (2013.01)

(52) U.S. Cl.
CPC .......... *G06F 3/0383* (2013.01); *G06F 3/0426* (2013.01); *G06F 3/04886* (2013.01); *G06F 2203/0331* (2013.01); *G06F 2203/0384* (2013.01)

(56) References Cited

U.S. PATENT DOCUMENTS

| | | | |
|---|---|---|---|
| 8,686,947 B2 | 4/2014 | Wine | |
| 8,701,050 B1 | 4/2014 | Starner et al. | |
| 2003/0142065 A1 | 7/2003 | Pahlavan | |
| 2003/0214481 A1* | 11/2003 | Xiong | G06F 3/017 345/157 |
| 2004/0263473 A1 | 12/2004 | Cho et al. | |
| 2012/0019373 A1 | 1/2012 | Kruse et al. | |
| 2012/0075173 A1* | 3/2012 | Ashbrook | G06F 3/014 345/156 |
| 2012/0139708 A1* | 6/2012 | Paradiso | G06F 3/014 340/10.1 |
| 2012/0319940 A1 | 12/2012 | Bress et al. | |
| 2013/0027341 A1* | 1/2013 | Mastandrea | G06F 3/014 345/173 |
| 2013/0135223 A1* | 5/2013 | Shai | G06F 3/014 345/173 |
| 2013/0234842 A1* | 9/2013 | Leitz | A63B 71/0669 340/323 R |
| 2014/0040810 A1* | 2/2014 | Haliburton | G06F 3/017 715/773 |
| 2014/0285416 A1* | 9/2014 | Priyantha | H04B 5/0037 345/156 |
| 2014/0298266 A1 | 10/2014 | Lapp | |
| 2015/0062086 A1* | 3/2015 | Nattukallingal | G06F 3/016 345/175 |
| 2016/0098086 A1* | 4/2016 | Li | G01P 13/045 345/173 |
| 2016/0209920 A1* | 7/2016 | Mastandrea | G06F 3/014 |
| 2016/0253044 A1* | 9/2016 | Katz | G06F 3/017 345/156 |
| 2017/0123510 A1* | 5/2017 | Parham | G06F 3/0308 |

OTHER PUBLICATIONS

Rosenberg, R et al, "The Chording Glove: A Glove-based Text Input Device", May 1999.
ISA Written Opinion & Search Report from PCT/US2015/018149, dated Feb. 27, 2015.

* cited by examiner

WEARABLE DEVICES FOR DETECTING FINGER MOVEMENTS AND RELATED METHODS

BACKGROUND

As computing devices have evolved, so have their input methods. Traditional mouse-pointers and keyboards are often used for input, as are software based virtual keyboards, such as the type used on smart phones and tablet devices. Other types of input, such as voice input, are also being used to provide input to modern computing devices.

BRIEF DESCRIPTION OF THE DRAWINGS

The following detailed description references the drawings, wherein.

DETAILED DESCRIPTION

Figure 1A:
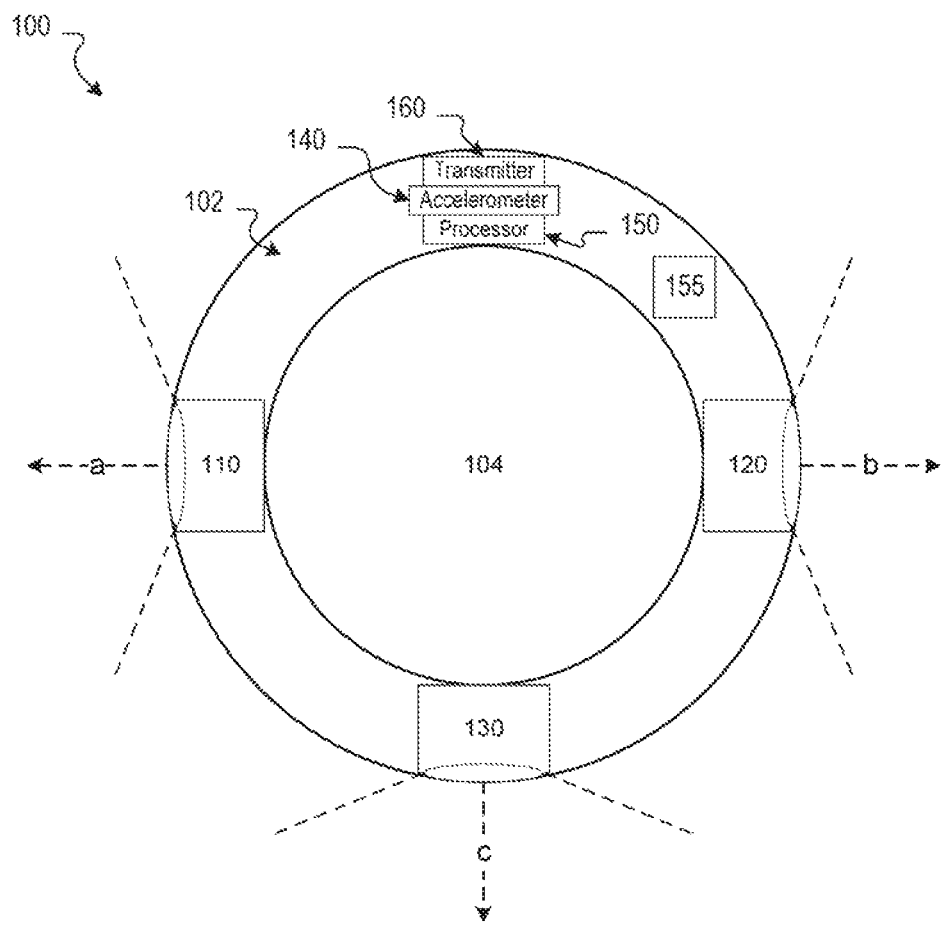
FIG. 1A is diagram of an example device for detecting finger movements.

Different types of user input may be used by a variety of computing devices for a variety of reasons. For example, personal computers may use mouse and keyboard input—controlled by a user—to run and use various computer applications; mobile computing devices, such as smart phones and tablets, may use touchscreen input—provided by a users fingers—to make calls, type messages on a software-based keyboard, and to use mobile phone applications; wearable computing devices, such as smart watches and smart glasses, may use voice and/or touch-screen input to control various functions; and some consumer electronic devices, such as televisions and video game consoles, may use voice and/or gesture based input—provided by a user's hand movements—to control television channels or play video games.

A device capable of detecting finger movements, and communicating information related to those finger movements, enables interaction with many computing devices, such as the devices described above. A ring-shaped device for use on a finger, for example, may include several sensors for detecting finger movements and communicating information related to those finger movements to various computing devices. An accelerometer included in a ring may detect movements of the finger the ring is worn on or movements of the user and/or the user's hand. Proximity sensors included in a ring may be able to detect movements of adjacent fingers, e.g., when worn on a users third (i.e., middle) finger, proximity sensors on the sides of the ring may detect independent movements of the adjacent fingers—the second and fourth (index and ring) fingers. A displacement sensor facing the bottom of the ring, e.g., the same direction as a users palm, may be used to detect multi-dimensional movements of the users hand across or relative to a surface. The ring may also include a data processor and communications device for processing data received from the sensors and communicate with another computing device.

By way of example, a ring-shaped wearable device for detecting finger movements may be used to provide input to another wearable computing device, such as a smart watch. The ring-shaped wearable device may be trained to interpret finger movements of the wearer as key presses on a text input keyboard, such as a virtual QWERTY keyboard, which may then be wirelessly transmitted to the smart watch. In many situations, detecting finger movements to provide input to a smart watch or other device may be preferable to using other input methods, such vocal and/or touch-screen keyboard input. For example, a full keyboard need not be displayed on a device with a small screen, a wearable device may use less space than a traditional keyboard and/or mouse device, and a health-conscious user may not need to physically touch input devices for public computing devices capable of communicating with a wearable device for determining finger movements. As another example, a wearable device worn on the finger may be trained to interpret finger and/or hand movements of the wearer as pointing device input, such as traditional computer mouse input, which may be wirelessly transmitted to another computing device, e.g., a personal computer. Further details regarding the detection of finger movements are discussed in further detail in the paragraphs that follow.

Figure 1B:
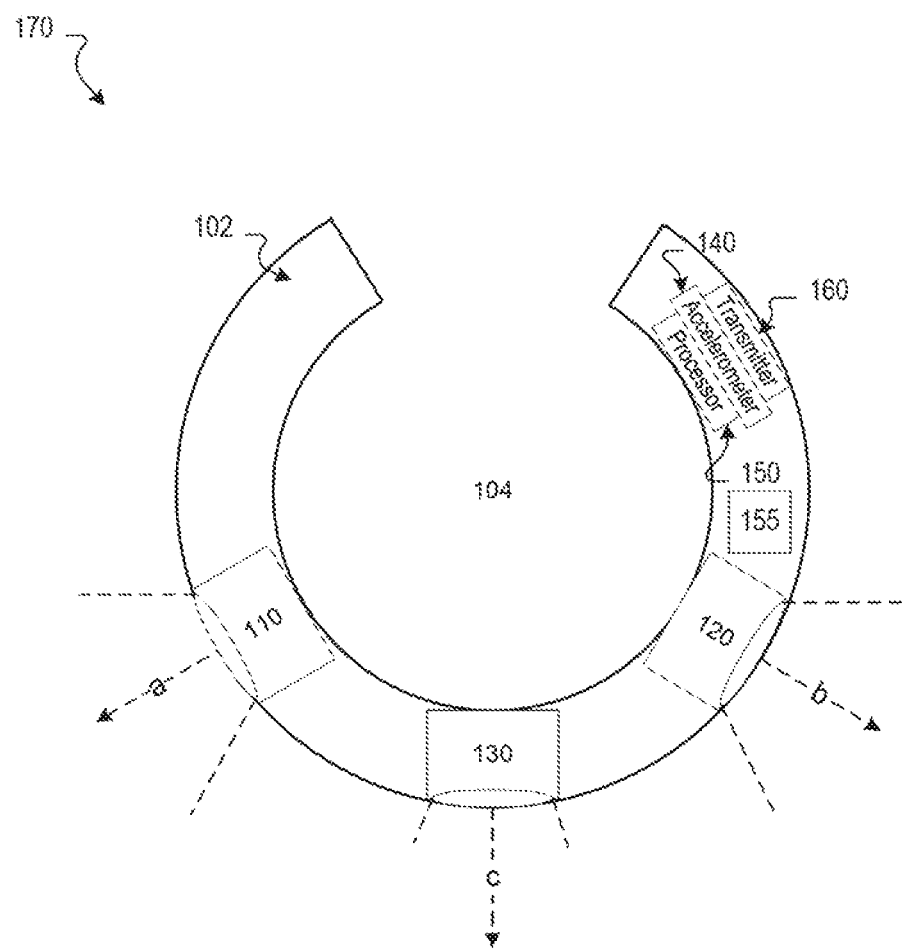
FIG. 1B is a diagram of another example device for detecting finger movements.

FIG. 1A is diagram of an example device 100 for detecting finger movements, while FIG. 1B is a diagram of another example device 170 for detecting finger movements. Each example device 100 and 170 has a ring-shaped frame 102 that defines a substantially circular space 104. Generally, the frame 102 and space 104 support the wearing of the device on a user's finger. Accordingly, the frame 102 need not be circular and may be in a form other than a ring, e.g., embedded in a glove or finger sleeve, or in the shape of a finger cap to be worn on the tip of a user's finger. Other shapes that support wearing the device on a users finger (or fingers) may be used for the frame 102. In addition, the frame may be made of any material suitable for both wearing by a user and including or otherwise supporting the attachment of the sensors and other components described below, such as any combination of polymer-based, composite, ceramic, and/or metallic materials. Various components may be described as being "included" or "coupled" to the frame, which indicates that the components are physically supported by and/or attached to either the interior or exterior of the frame, or physically supported by and/or attached—directly or indirectly—to any other object attached to the frame.

Each example device 100 and 170 includes two proximity sensor, a first proximity sensor 110 facing a first direction (a) and a second proximity sensor 120 facing a second direction (b). The proximity sensors are designed to measure the proximity of fingers adjacent to the finger on which the ring is worn. For example, when worn on a user's middle finger, the first proximity sensor 110 may measure the distance between the first proximity sensor 110 and the user's index finger, white the second proximity sensor 120 may measure the distance between the second proximity sensor 120 and the user's ring finger. In some implementations, a device may have only one proximity sensor. For example, when finger movements are to be detected for only two fingers, one proximity sensor is sufficient, e.g., a single proximity sensor for detecting index finger movements with a separate sensor to detect middle finger movements.

Example proximity sensors may include infrared (IR) emitter-detectors, analog or digital, that emit and detect IR light; physical buttons, capacitive touch sensors, resistive touch sensors, and acoustic wave transmitter-receivers. The output produced by a proximity sensor may vary depending on the type of proximity sensor used. For example, an IR emitter-detector may output a voltage measurement that varies based on how close an object is to the sensor, while a capacitive touch sensor may have binary output indicating contact with the sensor or no contact.

As shown in the example devices 100 and 170, the positioning of the first and second proximity sensors may vary. The orientation, location, detection distance, and detection angle of the proximity sensors may all vary, and may also depend on the type of sensor used. For example, a touchpad-like capacitive sensor may be arranged to maximize contact with fingers adjacent to the finger on which the ring device is worn, e.g., to increase the likelihood that finger movements will be detected. An IR emitter-detector, on the other hand, may be arranged to face a direction designed to increase the likelihood of detecting a difference in voltage when a finger is moved, e.g., angled closer to the bottom of the ring to detect when the bottom of a user's finger is raised/lowered. Other proximity sensor configurations may also be used to defect a user's finger movements, The example devices 100 and 170 include a two-dimensional displacement sensor 130 facing a third direction (c). The displacement sensor 130 is designed to measure two-dimensional movement of the devices 100 and 170 relative to a surface. For example, when device 100 is worn on a user's finger and the displacement sensor 130 is facing or in contact with a surface, such as a table or wall, the displacement sensor 130 may measure the distance and/or direction of movements across the surface. By way of example, the displacement sensor 130 may be an optical sensor, such as a type similar to one used in an optical mouse; or an accelerometer that measures the direction and magnitude of proper acceleration in two or more dimensions.

Example devices 100 and 170 each Include an accelerometer 140. The accelerometer 140 is designed to measure magnitude and/or distance of proper acceleration in up to three dimensions, and may be used to detect movements of the finger on which the ring is worn as well as movements of the user and/or the users hand. For example, when device 100 is worn on a user's middle finger, movement detected by the accelerometer 140 may correspond to movement of the middle finger. In Implementations where the two-dimensional displacement sensor 130 is a two or three-dimensional accelerometer, the same accelerometer may be used for sensing both two-dimensional displacement and finger movements. In situations where an accelerometer is used as the displacement sensor 130, it need not face any direction.

The data processor 150 included in the example devices 100 and 170 may be one or more microcontrollers, central processing units (CPUs), semiconductor-based microprocessors, and/or other hardware devices suitable for retrieval and execution of instructions, e.g., instructions stored in a machine-readable storage medium 155. The hardware data processor 150 may fetch, decode, and execute instructions to control the process for detecting finger movements. As an alternative or in addition to retrieving and executing instructions, hardware processor 150 may include- one or more electronic circuits that include electronic components for performing the functionality of one or more instructions, e.g., a microcontroller that includes both a data processor and embedded storage.

Each example device 100 and 170 also includes a transmitter 160, e.g., for communicating with another device. The transmitter 160 may be for wired and/or wireless communications. For example, the transmitter 160 component may include a micro or mini-USB port for transmitting data with another device. A wireless transmitter 160 may include, for example, Wi-Fi, Bluetooth, and/or cellular data transmitter(s).

The example devices 100 and 170 may also include other components not shown in the example implementations. For example, a thin film battery may be coupled to the ring tor providing power to other components. As another example, ornamentation may be added for purely decorative purposes or for a combination of decorative and functional purpose, e.g., data storage, battery storage, or power/data port may be included and/or hidden In a decorative portion of a wearable device.

In situations where the example device 100 or 170 is operational, the data processor 150 is operable to receive input from the accelerometer 140, the first and second proximity sensors, 110 and 120, and the displacement sensor 130. The data processor 150 generates output based on the input received from the various sensors and causes the transmitter 160 to transmit data specifying the output, e.g., to a connected device.

In situations where the device 100 is worn on a users middle finger, for example, the data processor 150 may determine that i) a user's index finger moved based on input received from the first proximity sensor 110, ii)) a user's ring finger moved based on input received from the second proximity sensor 120 iii) a user's middle finger (wearing the ring) moved based on input from the accelerometer 140 and/or the first and second proximity sensors 110 and 120. The data processor 150 may also determine, based on the input received from the displacement sensor 130, the direction and magnitude of movements of the user's hand over a surface. Other information may be determined by the data processor 150 based on any combination of input from one or more of the sensors included in the example devices 100 and 170.

The output generated and transmitted by the example devices 100 and 170 may vary. For example, the device 100 may transmit, to a separate computing device, data that indicates the output of one or more of the sensors, allowing the computing device to use the sensor information for any suitable purpose. In some implementations, instructions included on machine-readable storage medium 155 include instructions for interpreting the input of the various sensors. For example, the instructions may include instructions for interpreting finger movements as key presses on a QWERTY keyboard or other type of computer keyboard, number selections on a numerical keypad, strings played on a virtual guitar, computer moose pointer movements and selections/clicks, key presses on a piano keyboard, gesture-based input using the accelerometer, or other types of events. Example instructions stored on the storage medium 155 and operations performed by the data processor 150 are described in further detail in the paragraphs that follow.

Figure 2A:
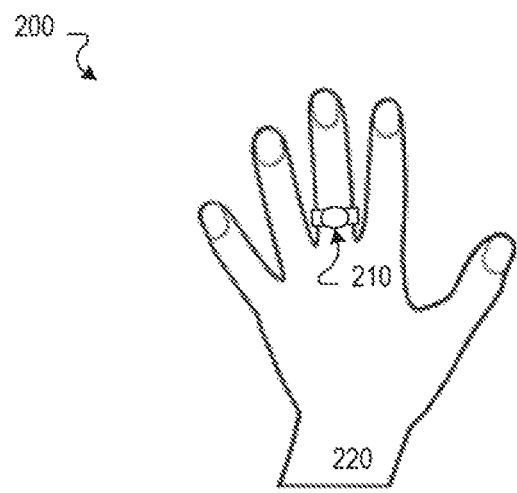
FIG. 2A is an illustration of an example wearable device shown on a user's finger.

FIG. 2A is an illustration 200 of an example wearable device shown on a user's finger. The illustration 200 depicts a wearable sing 210 when viewing the back of a user's hand 220. The design of the ring 210 may vary, and may include adornment that is purely ornamental, functional, or a combination of the two. For example, one or more components of the ring 210, such as the processor, accelerometer, transmitter, storage medium, etc., may be included in an ornamental housing.

Figure 2B:
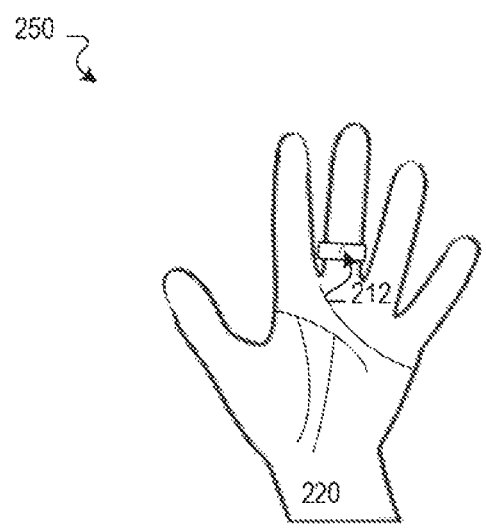
FIG. 2B is an illustration of another example wearable device shown on a user's finger.

FIG. 2B is an illustration 250 of another example wearable device shown on a user's finger. The illustration 250 depicts a two-dimensional displacement sensor 212 of the wearable ring when viewing the palm of the user's hand 220. For example, the displacement sensor 212 may be an optical sensor that detects two-dimensional displacement of the hand 220 over a surface,.

Figure 3:
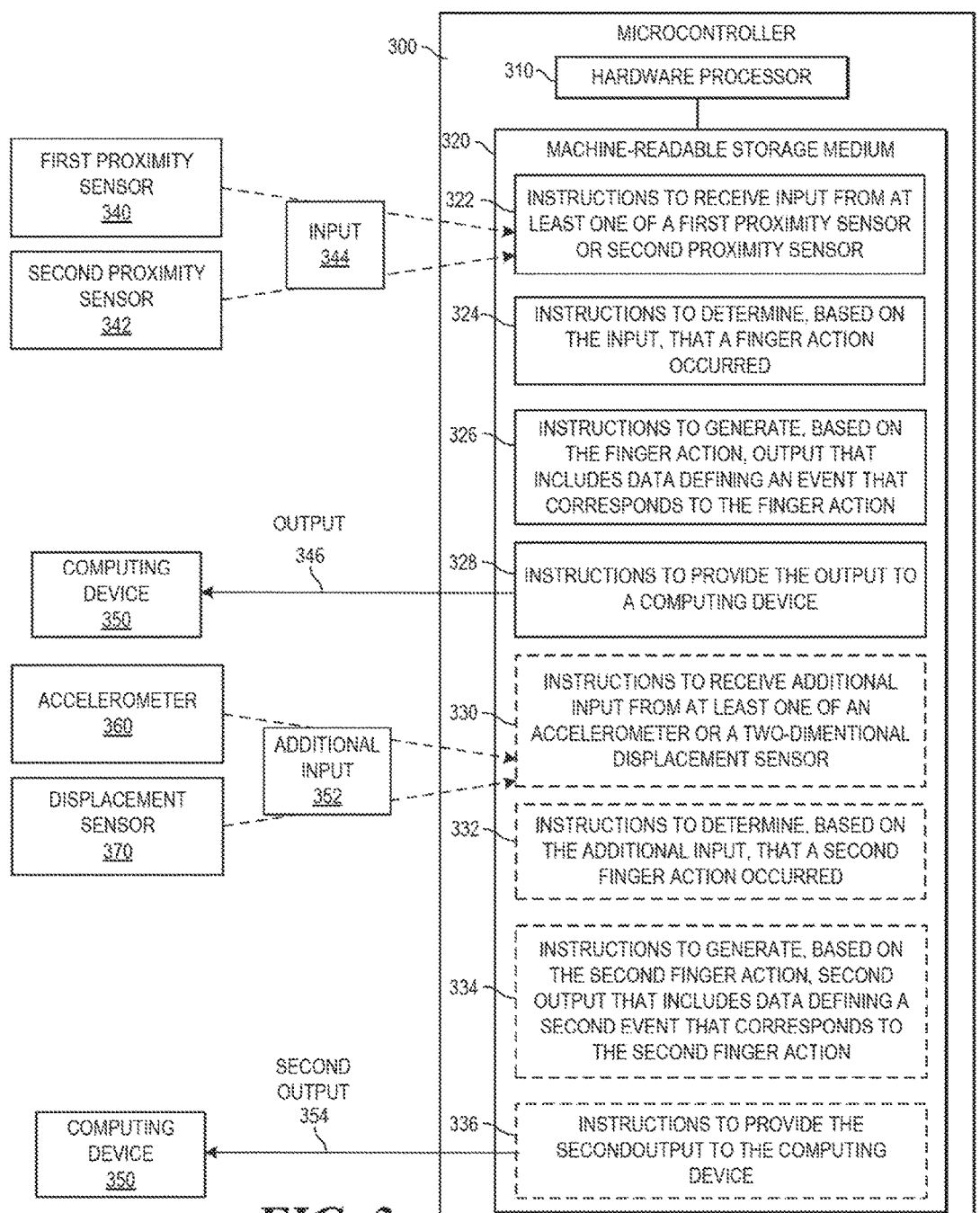
FIG. 3 is a block diagram of an example microcontroller for detecting finger movements.

FIG. 3 is a block diagram of an example microcontroller 300 for detecting finger movements. Microcontroller 300 may be included, for example, in a ring, glove, finger sleeve, or any other device suitable for housing components, such as the components described with reference to FIGS. 1A and 1B, for detecting finger movements. In the embodiment of FIG. 3, microcontroller 300 includes a hardware processor, 310, and machine-readable storage medium, 320.

Microcontroller 310 may be one or more integrated circuits that include electronic components suitable for retrieval and execution of instructions stored in machine-readable storage medium 320, which may also be included in the integrated circuit(s). Hardware processor 310 may fetch, decode, and execute instructions, such as 322-336, to control the process for detecting finger movements. As an alternative or in addition to being an integrated circuit containing a processor and data storage medium, hardware processor 310 may be one or more central processing units (CPUs), semiconductor-based microprocessors, microcontrollers, and/or other hardware devices suitable for retrieval and execution of instructions stored on a separate machine-readable storage medium.

A machine-readable storage medium, such as 320, may be any electronic, magnetic, optical, or other physical storage device that contains or stores executable instructions. Thus, machine-readable storage medium 320 may be, for example, Random Access Memory (RAM), an Electrically Erasable Programmable Read-Only Memory (EEPROM), a storage device, an optical disc, and the like. In some implementations, storage medium 320 may be a non-transitory storage medium, where the term "non-transitory" does not encompass transitory propagating signals. As described in detail below, machine-readable storage medium 320 may be encoded with a series of executable instructions: 322-336, for detecting finger movements.

As shown in FIG. 3, the microcontroller 300 receives input 344 from a first proximity sensor 340 and/or a second proximity sensor 342 (322). The first proximity sensor 340 may be coupled to a ring-shaped frame at a first position and face a first direction, while the second proximity sensor 342 may be coupled to the frame at a second location and face a second direction. The input 344, while it may vary depending upon the type of proximity sensor(s) being used, generally provides an indication of proximity of the corresponding sensor to an object, such as a finger. In situations where an IR emitter-detector is used, for example, the input 344 may be a voltage measurement. The input 344 may be provided to the microcontroller periodically and/or in response to an event, e.g., IR sensor measurements may be provided periodically, while contact and/or disengagement with a capacitive proximity sensor may trigger provision of input.

The microcontroller 300 determines, based on the input 344, that a finger action occurred (324). The finger action may be a first movement of a first finger detected by the first proximity sensor 340 or a second movement of a second finger detected by the second proximity sensor 342. In some implementations, the microcontroller 300 may determine that a finger movement occurred in response to a proximity measurement included in the input 344 meeting a threshold proximity measurement. For example, an IR sensor may periodically provide distance measurements indicating how far away from the sensor a users finger is, and a distance threshold may be designed to be met when the user lifts the finger.

The microcontroller 300 generates, based on the finger action, output 346 that includes data defining an event that corresponds to the finger action (328). The machine-readable storage medium 320 may include, for example, instructions to determine an event that corresponds to a finger movement or combinations of finger movements. In some implementations, the event may be a virtual keyboard key selection, and the output 346 may specify the selected virtual keyboard key. For example, the microcontroller 300 may determine that the first finger movement corresponds to a selection of the "J" key on a virtual keyboard, and the selection of the "J" key may be the event defined by the output 346. Methods for determining events associated with finger actions may vary, and are discussed in further detail below.

The microcontroller 300 provides the output 346 to a computing device 350 (328). The computing device 350 may be, for example, another wearable computing device, such as a smart watch or smart glasses; a personal computer, such as a laptop or desktop computer; a server computer; a video game console; a smart television; or any other computing device capable of communicating with and processing input provided by the microcontroller 300. The output 346 may be provided to the computing device 350 in a variety of ways, e.g., using a data transmitting cable, Wi-Fi, Bluetooth, etc.

In some implementations, the microcontroller 300 receives additional input 352 from an accelerometer 360 or a two-dimensional displacement sensor 370 (330). The displacement sensor 370 may be coupled to the frame at a third position and face a third direction, and the third position may be between the first and second position of the first and second proximity sensors. In some implementations, the additional input 352 may be data indicating a measure displacement between a first surface location and a second surface location, e.g., provided by the displacement sensor 370. For example, the additional input may be a vector provided by an optical sensor that specifies a direction and magnitude of movement of the optical sensor.

In implementations where additional input 352 is received, the microcontroller 300 may determine, based on the additional input 352, that, a second finger action occurred (332). The second finger action may be, for example, a displacement of a wearable device relative to a surface, e.g., determined using the additional input 352 received from the displacement sensor 370. In some implementations, the determination that the second finger action is a displacement of the wearable device may occur in response to determining that a measure of displacement, e.g., the additional input 352 provided by the displacement sensor 370, meets a displacement threshold. As another example, the second finger action may be a third movement of a third finger, where the third movement is detected by the accelerometer 360. In some implementations, the determination that the second finger action is the movement of the third finger may occur in response to determining that a measure of acceleration, e.g., the additional input 352 provided by the accelerometer 360, meets an acceleration threshold.

In some implementations, the microcontroller 300 generates, based on the second finger action, second output 354 that includes data defining a second event that corresponds to the second finger action (334). For example, in situations where the second finger action is a displacement of the wearable device, the microcontroller 300 may generate second output 354 that includes data defining a selection of keys for a virtual keyboard display. E.g., when used to type on a virtual keyboard, the second event may be defined by specifying a subset of keys eligible for selection on the virtual keyboard.

In implementations where second output 354 is generated, the microcontroller 300 provides the second output to the computing device 350 (336). The second output 354 may be provided to the computing device 350 in the same or a different manner than the first output 346. The manner in which the computing device 350 handles the first and second outputs may vary, e.g., depending on the type of computing device 350. Example computing devices and methods for handling output provided by the microcontroller 300 are described in further detail below.

While FIG. 3 depicts example steps 322-336 being performed by the microcontroller 300, the order of the steps 322-336 may vary. For example, the second input 352 may be received and processed prior to the first input 344, and the second output 354 may be provided before the first output 346. In some implementations, outputs may be combined into a single output specifying one or more actions. Input may be received from any of the sensors in any order, and processed serially and/or in combination with other sensor input.

In addition, methods for determining when a finger action occurs, and for calculating thresholds associated with determining finger actions, may vary. In some implementations, measurements of one or both proximity sensors may be used in combination with measurements of the accelerometer 360 and/or the displacement sensor 370. For example, a model may be trained to receive, as input, periodic measurements from the proximity sensor(s) and the accelerometer and, based on the input, provide output specifying a probability that a particular finger movement occurred. E.g., because movements of the index and/or ring finger may also cause changes in the accelerometer readings of an accelerometer included in a ring worn on the user's middle finger, this information may be used, in combination with proximity measurements, to provide a likelihood that a particular finger movement occurred.

A Hidden Markov Model, for example, may be trained to classify various types of input as one or more finger movements. Because the manner in which a user may move fingers may depend upon the type of input being provided, models may be separately trained based on the manner in which the input is to be interpreted. For example, a model for determining textual QWERTY keyboard input may be trained and used separately from a model for determining mouse pointer input, virtual piano key input, virtual guitar input, and/or other types of input. Models may be periodically retrained, e.g., based on feedback received from one or more user's, and may be trained for an individual user or multiple users. Models for one or more types of input may be stored in machine-readable storage medium 320, and used based on the typed of computing device output is being provided to and/or based on user preference/selection.

Other types of input may also be provided based on determining finger movements, such as gesture-based movements and two-dimensional translation movements used for input on multi-touch devices. For example, a model may be trained to classify various gestures, such as pitch, roll, and yaw, e.g., defected by an accelerometer. Gesture-based input may be used separately and/or in combination with other forms of input, e.g., when typing, a particular gesture may be mapped to a common function, such as a return—the "Enter" key on a traditional QWERTY keyboard. On multi-touch devices, a ring worn on each hand of a user, for example, may be used to provide typical multi-touch gestures using the two-dimensional displacement sensors of the rings, e.g., pinch, expand, and swipe gestures.

Figure 4:
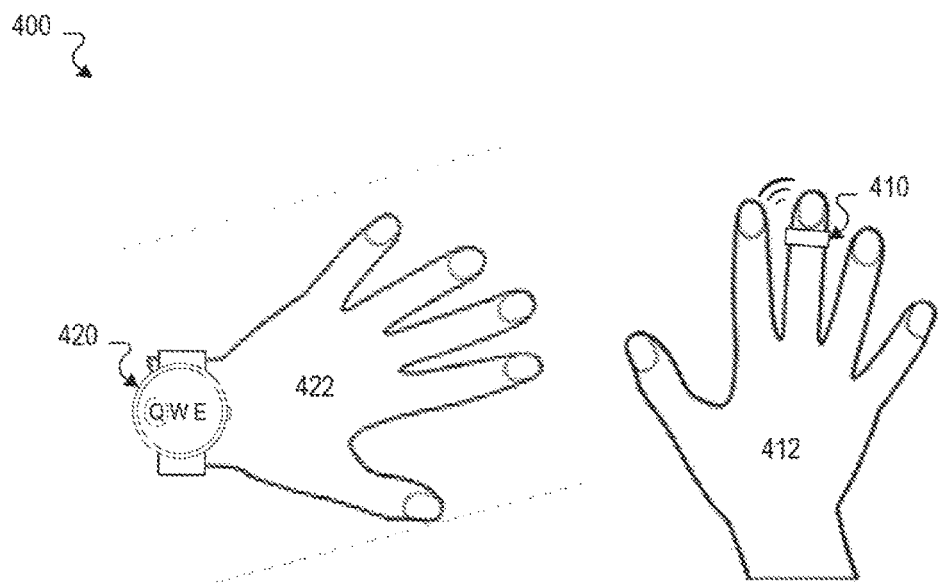
FIG. 4 is an illustration of an example environment in which a device for detecting finger movements is used.

FIG. 4 is an illustration of an example environment 400 in which a device for detecting finger movements is used. The example device is a ring 410 depicted on a user's right hand 412. The ring 410 may include various components, such as those described above with reference to FIGS. 1-3; e.g., a processor, a data storage device, an accelerometer, a transmitter, a first and/or second proximity sensor, and a displacement sensor.

The ring 410 is shown in wireless communication with a second example device, a smart watch 420, worn on the user's left hand 422. The smart watch 420 may be, for example, a wearable computing device capable of communicating with the ring 410. In the example environment 400, the ring 410 is being used to provide textual input for the smart watch 420.

By way of example, the user may cause textual input to be provided to the smart watch 420 using various finger movements while wearing the ring 410, causing the ring 410 to interpret the finger movements and provide the watch 420 with input that corresponds to the various movements. For example, the index, middle, and ring finger of the user's right hand 422 may each correspond to one letter on a virtual QWERTY keyboard. Finger movements, including movements of the ring 410 itself, may be interpreted by the ring 410, and virtual keyboard key selection events may be provided to the smart watch 420 to enable textual input on the smart watch 420 using the ring 410.

In the example environment 400, the smart watch 420 currently displays the letters, "QWE," as letters eligible for selection by finger movements. Movement of the user's index finger may result in selection of the letter, "Q," movement of the user's middle finger may result in selection of the letter, "W," and movement of the user's ring finger may result in selection of the letter, "E." In addition, two-dimensional movement of the ring 410 relative to a surface, e.g., sliding the ring 410 across a table or wall, may result in the watch 420 displaying a different set of letters eligible for selection by finger movements. In the example environment 400, selection of the letter, "Q," is depicted, e.g., as indicated by the dotted line around the letter, "Q." This selection may be caused in response to the ring 410 interpreting a finger movement of the user's index finger, e.g., using a proximity sensor included in the ring 410 that is facing the user's index finger.

Figure 5:
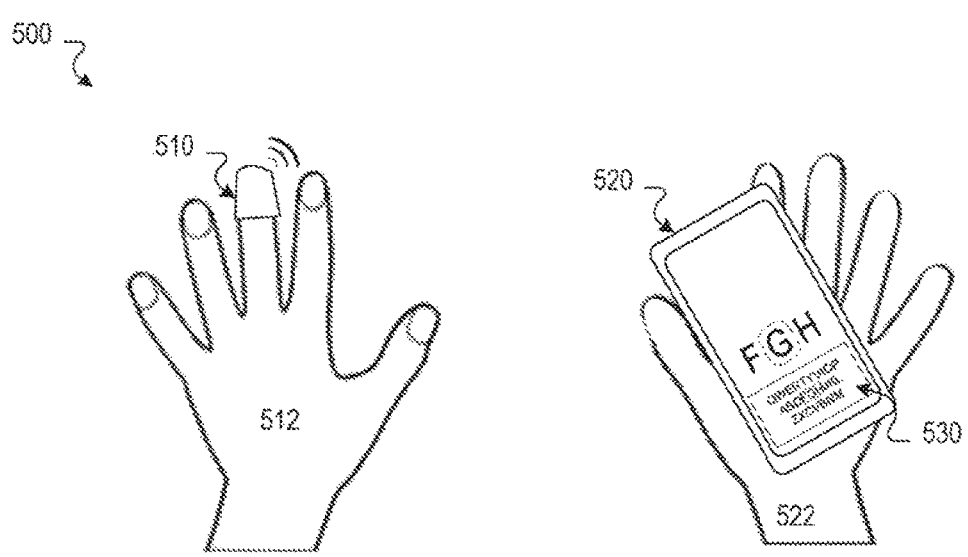
FIG. 5 is an illustration of another example environment in which a device for detecting finger movements is used.

FIG. 5 is an illustration of another example environment 500 in which a device for detecting finger movements is used. In this example, the device is a finger cap 510 depicted on a user's left hand 512. As with the ring 410 of FIG. 4, the finger cap 510 may include various components, such as those described above with reference to FIGS. 1-3; e.g., a processor, a data storage device, an accelerometer, a transmitter, a first and/or second proximity sensor, and a displacement sensor.

The cap 510 is shown in wireless communication with another example computing device, a smart phone 520, held in the user's right hand 522. As with the smart watch 420 of FIG. 4, the smart phone 520 is a computing device capable of communicating with the cap 510, and the cap 510 is being used to provide textual input for the smart phone 520.

The finger cap 510 may, e.g., in a manner similar to that of the ring described above with reference to FIG. 4, interpret various types of finger movements of the left hand 512 as selections of keys on a virtual keyboard displayed on the smart phone 520. In the example environment 500, a virtual QWERTY keyboard 530 is displayed on the smart phone 520, with the letters currently eligible for selection— "FGH"—displayed on the phone 520 in an enlarged form. As the user moves the finger cap 510 around, the cap 510 may provide the phone 520 with data indicating that the letters eligible for selection by linger movements has changed. For example, the finger cap 510 may send data to the smart phone 510 indicating that the letters eligible for selection changed to "RTY." The data may be sent to the phone 520 by the cap 510 in response to determining, by a processor included in the cap 510, that the cap 510 moved in a particular direction, e.g., forward, or up.

The smart phone 520 display indicates that the letter, "G," has been, or is being, selected, e.g., as indicated by the dotted line around the letter. The selection may be caused by the finger cap 510 interpreting a finger movement of the user's middle finger (the finger on which the cap 510 is worn), e.g., using an accelerometer included in the cap 510.

The different designs of some computing devices for detecting finger movements may allow for a variety of sensor configurations and placements. For example, a two-dimensional optical displacement sensor included in the finger cap 510 may be positioned near the tip or apex of the finger cap 510, e.g., facing a direction substantially aligned with the direction the fingertip of the finger on which the cap 510 is worn is pointing. The foregoing sensor configuration enables, for example, detecting two-dimensional displacement relative to a surface the user's finger is pointing at, in addition to or separately from detecting two-dimensional displacement relative to a surface under the bottom of the fingertip.

The manner in which computing devices display keys eligible for selection, the selection of keys, and/or other events associated with finger movements may vary. For example, keys may be highlighted on a virtual keyboard when eligible for selection and/or selected, only the selected key may be displayed, only the keys currently eligible for selection may be displayed. In some implementations, computing devices may use audio feedback to indicate keys eligible for selection and/or the keys selected.

Figure 6:
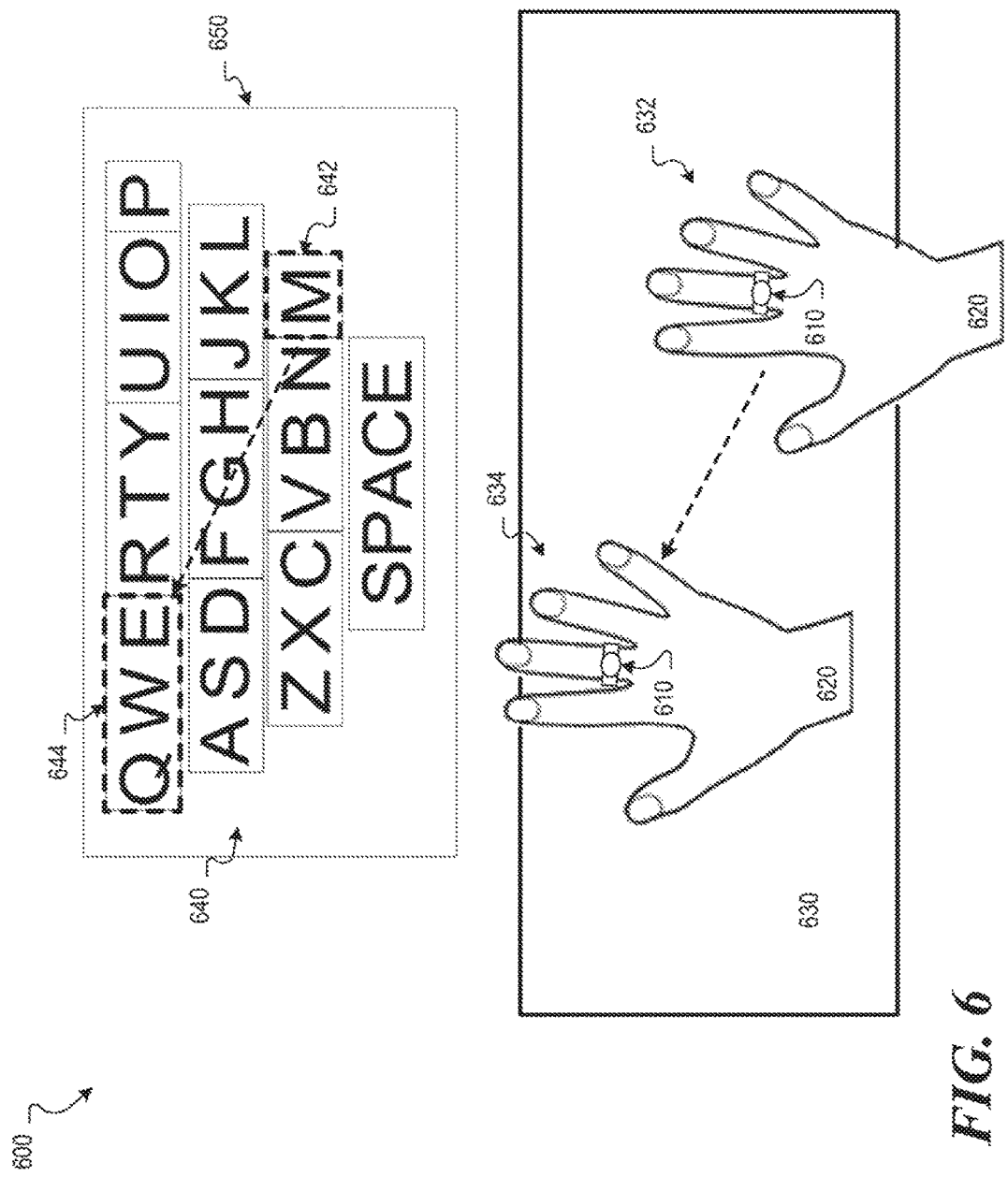
FIG. 6 is an illustration of an example environment in which a wearable device is used for QWERTY keyboard input.

FIG. 6 is an illustration of an example environment 600 in which a wearable device is used for QWERTY keyboard input. In this example, a wearable ring 610 is depicted on the right hand 620 of a user. The hand 620 and ring 610 are shown over a surface 630, such as a table, wall, or other surface suitable for sensing two-dimensional displacement relative to, e.g., using an optical sensor. The example environment 600 also includes a virtual keyboard 640 as shown on a display 650 of a computing device, e.g., a device a communication with the ring 610, such as a computer screen, smart phone display, and/or smart watch display.

In the example environment 600, the user's hand 620, and the ring 610, are depicted at a first position 632 and a second position 634. Similarly, the virtual keyboard 640 includes an indication of a first set of keys 642 eligible for selection when the ring 610 is at the first position 632 and a second set of keys 644 eligible for selection when the ring 610 is at the second position 634. In this example, the virtual keyboard 640 is broken up into zones of three or fewer keys, and translation of the ring 610 substantially corresponds with translation from one zone of the virtual keyboard 640 to another. E.g., movement of the ring 610 from the first position 632 up and left to the second position 634 is interpreted by the ring 610 as a movement from the first zone 642 to the second zone 644. As another example, a slight movement from the left, from the first position 632, may result in selection of the zone including the keys, "VBN," while a larger movement to the let may result in selection of the zone including the keys, "ZXC."

In some implementations, a sliding window of eligible keys may be used to select keys of a virtual keyboard. For example, when starling in the upper left of the virtual keyboard 640 at the letters, "QWE," a slight movement to the right may result in a sliding window moving to highlight the letters, "WER," as the letters eligible for selection. Other methods for selecting the keys eligible for selection may also be used, e.g., zones of two or fewer keys, a sliding window of one or two keys, etc.

While the example environment 600 depicts a method for causing the display of portions of a virtual keyboard 640 eligible for selection, the selection of one or more keys may be determined based on finger movements. For example, white at the first position 632, a finger movement of any finger may cause the Setter, "M," to be selected. While at the second position 634, each key of the second set 644 may correspond to a finger, the movement of which will trigger selection of the corresponding key. E.g., movement of the index finger may result in selection of the letter, "Q," movement of the middle finger may result in selection of the letter, "W," and movement of the ring finger may result in selection of the letter, "E."

Finger movements, including both two-dimensional translation and individual finger movements, may be detected using one or more of the sensors included in the ring 610. The measurements of the sensors included in the ring 610 may be processed, in whole or in part, by a processor included in the ring 610 and/or the computing device to which the display 650 belongs, e.g., a smart phone or smart watch. While FIG. 6 provides an example for providing QWERTY keyboard input, input for other types of keyboards or input devices may also be used, such as AZERTY keyboard input, input for non-alphabetic keyboards, e.g., symbolic or other character-based keyboards, and other input devices described above.

Figure 7:
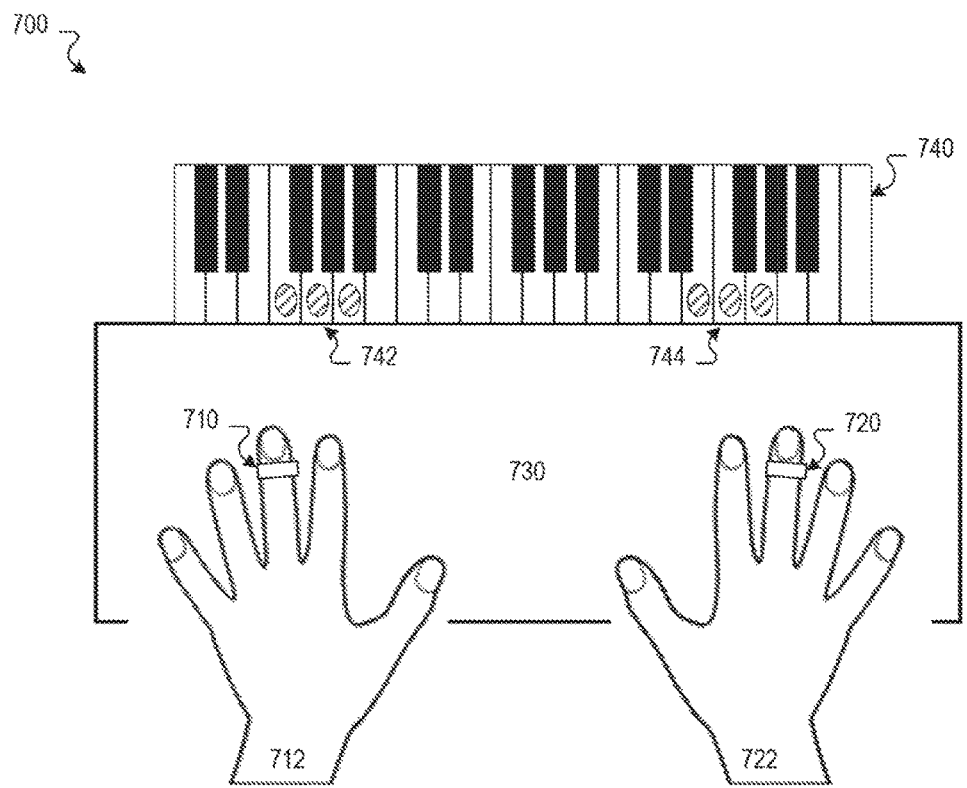
FIG. 7 is an illustration of an example environment in which multiple wearable devices for detecting finger movements may be used.

FIG. 7 is an illustration of an example environment 700 in which multiple wearable devices for detecting finger movements may be used. The example environment 700 depicts two wearable devices, a first ring 710 on the middle finger of a user's left hand 712 and a second ring 720 on the middle finger of the user's right hand 722, for playing a virtual musical instrument. The user's hands and the rings are shown above a surface 730, such as a table or wall. In this example, finger movements may correspond to key selection of keys on a virtual piano 740.

Each ring corresponds to a set of eligible piano keys. For example, the first ring 710 may correspond to the left set of eligible piano keys 742, while the second ring 720 may correspond to the right set of eligible piano keys 744. While both rings may be in communication with the computing device currently causing display of the virtual piano 740, their movements may be interpreted independently. Accordingly, the user may move the left hand 712 with the left ring 710, and/or make finger movements using any fingers of the left hand 712, and the movements may be interpreted and processed independently of hand/ring/finger movements of the right hand/ring/fingers.

As with the identification of eligible keys and selection of individual keys described above with reference to the virtual QWERTY keyboard of FIG. 6, the manner in which finger movements control the virtual piano 740 may vary. For example, key zones and/or sliding key windows may be used to determine which virtual piano keys are eligible for selection, while individual finger movements may be used to cause selection of one or more virtual keyboard keys. E.g., by sliding the left hand 712 up, a displacement sensor included in the first ring 710 may cause the eligible piano keys 742 to shift from the current three white keys depicted to the three black keys above, and movements of the index, middle, and/or ring fingers may cause selection of the corresponding eligible virtual piano key. Accordingly, the user may "play" the virtual piano by sliding the hands and rings in the direction of desired keys on the virtual piano to choose eligible virtual piano keys and use individual finger movements, e.g., lifting and/or pressing down relative to the surface 730, to cause selection of eligible virtual piano keys.

As with the example described above with reference to FIG. 6, measurements of various sensors included in the rings, 710 and 720, may be processed, in whole or in part, by a processor included in each ring and/or the computing device that is causing display of the virtual piano 740. For example, each ring may, independently or in combination with the other ring, determine which virtual piano key(s) is/are pressed and provide data indicating selection of the virtual piano key(s) to the computing device, e.g., to enable the computing device to produce the sound that corresponds to the selected key(s) and/or alter the display of the virtual keyboard 740.

Multiple wearable devices for detecting finger movements may be used in a variety of other situations. For example, multiple wearable devices may be used to interpret determine finger movements that correspond to QWERTY keyboard input, virtual guitar input, and multi-touch touch-screen input, to name a few. In some implementations, two or more devices may be used by multiple users, enabling the detection and interpretation of finger movements as provided by the users using/wearing the devices.

Figure 8:
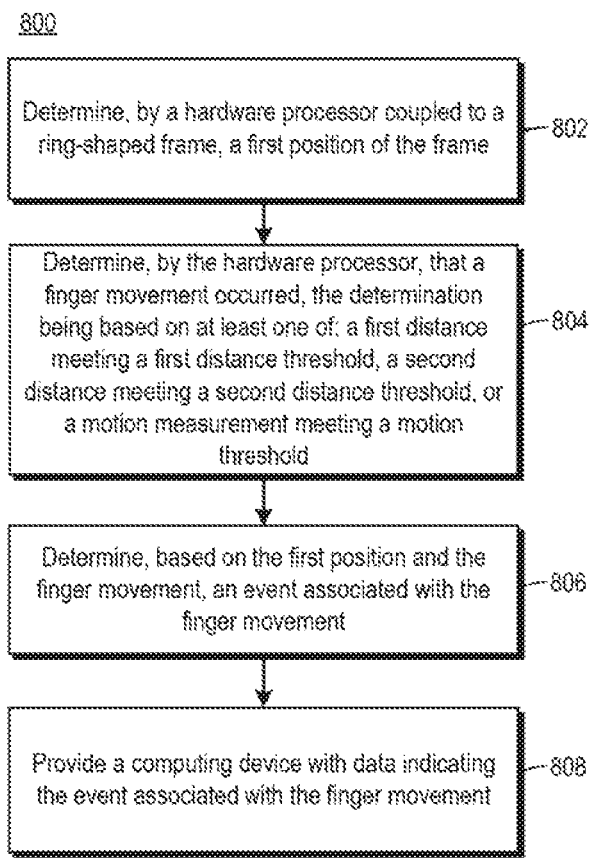
FIG. 8 is a flowchart of an example method for detecting finger movements.

FIG. 8 is a flowchart of an example method 800 for detecting finger movements. The method 800 may be performed by a computing device, such as the data processor and/or microcontroller described in FIG. 3. Other computing devices may also be used to execute method 800. Method 800 may be implemented in the form of executable instructions stored on a machine-readable storage medium, such as the storage mediums 155 and 320 and/or in the form of electronic circuitry.

A hardware processor coupled to a ring-shaped frame determines a first position of the frame (802). In some implementations, the first position may be determined based on input received from a two-dimensional displacement sensor coupled to the frame. For example, an optical sensor included in a ring may i) detect when a surface is proximate, and ii) determine two-dimensional movement(s), e.g., magnitude and direction of translation of the sensor in substantially the same plane as the surface.

The hardware processor determines that a finger movement occurred, the determination being based on at least one of: a first distance meeting a first distance threshold, a second distance meeting a second distance threshold, or a motion measurement meeting a motion threshold (804). The first distance may be measured by a first proximity sensor coupled to the frame, the second distance may be measured by a second proximity sensor coupled to the frame, and the motion measurement may be measured by an accelerometer coupled to the frame.

By way of example, an IR emitter-detector sensor may periodically provide distance measurements to the hardware processor, which may compare the distance measurements to a threshold to determine whether a finger movement has occurred. As another example, measurements received from the accelerometer may be compared to a separate threshold to determine if a finger movement has occurred. In some implementations, as noted above, other methods may be used for determining if a finger movement occurs. E.g., a model may be trained to predict, based on both periodic proximity measurements and accelerometer measurements, whether a finger movement occurred and, if so, which finger movement was most likely to have occurred. In situations where the probability of a finger movement exceeds a threshold, the hardware processor may determine that a finger movement occurred.

Based on the first position and the finger movement, an event associated with the finger movement is determined (806). For example, the first position may correspond to a first keyboard position of multiple keyboard positions for a virtual keyboard, the first keyboard position may correspond to a first set of keyboard keys, e.g., "JKL," and the event associated with the finger movement may be a selection of one of the keys included in the first set of keyboard keys. The key selected from the first set of keyboard keys may depend on the basis upon which the finger movement was determined, with each key in the first set being associated with a separate finger movement.

In some implementations, the hardware processor may determine that the first key of the first set of keys is selected in response to determining that the first distance meets the first distance threshold. If, for example, the finger movement was detected based on measurements received from the first proximity sensor, finger movements of this type may be associated with the first letter of each set which, in this example, is the letter "J." The hardware processor may determine that a second key of the first set of keys is selected in response to determining that the second distance meets the second distance threshold, and/or may determine that a third key of the first set of keys is selected in response to determining that the motion measurement meets the motion threshold. For example, the accelerometer, which produces the motion measurement, may be associated with the middle letter, "K," as the motion measurements of the accelerometer in this example may be associated with the middle finger of the user, e.g., the finger wearing the ring. Movement of the user's ring finger, detected by the second motion sensor, may accordingly be associated with the letter, "L."

A computing device is provided with data indicating the event associated with the finger movement (808). For example, the event associated with the finger movement may be the selection of a letter, and the data may be provided as a key selection event to be interpreted and handled by the computing device, e.g., textual input for an application running on the computing device. Using the textual input example, the hardware processor may provide a separate computing device with textual input by interpreting the finger movements of a user wearing a ring that includes the hardware processor.

In some implementations, the hardware processor may determine, based on second input received from the two-dimensional displacement sensor:, that the frame is positioned at a second keyboard position, which corresponds to a second set of keyboard keys. For example, the displacement sensor may provide input indicating that the ring has moved to the users left, which may be associated with a movement from the set of letters, "JKL," to the set of letters, "FGH." The actual set of keys may depend upon the magnitude and direction of the movement(s) provided by the displacement sensor, e.g., relative to the first position. In some implementations, magnitude and direction thresholds may be used by the hardware processor to allow tolerance with respect to changing keyboard positions based on two-dimensional movements. E.g., very flight movements may not result in any change in keyboard position, while large movements may result in changing to keyboard positions further away than moderate movements. As discussed above, the thresholds and tolerance levels may be a combination of predetermined and/or machine learned values.

After determining that the frame is positioned at a second keyboard position, the hardware processor may determine that a second finger movement occurred, e.g., in a manner similar to the manner in which the first finger movement occurred. Based on the second keyboard position and the second finger movement, a second event associated with the second finger movement may be determined. For example, after determining that the keyboard position changed to a position associated with the keys, "FGH," the hardware processor may determine that the letter, "H," was selected due to the second finger movement being detected based on measurements provided by the second proximity sensor. After determining the second event associated with the second finger movement, the hardware processor may provide the computing device with data indicating the second event, the selection of the letter, "H."

The steps of method 800 while described in order of steps 802-808, may—in some implementations—be performed in combination with one or more other steps, and/or may be performed in a different order. For example, movement from a first position of the frame to a second position may be determined prior to determining the occurrence of any finger movements. As another example, when multiple finger movements are detected, the output provided to the computing device may be combined, e.g., providing multiple letters to the computing device at a time. Key selection on a virtual keyboard for providing textual input is one example use of the method 800, and the method 800 may be used for providing other types of event data associated with finger movements.

Figure 9:
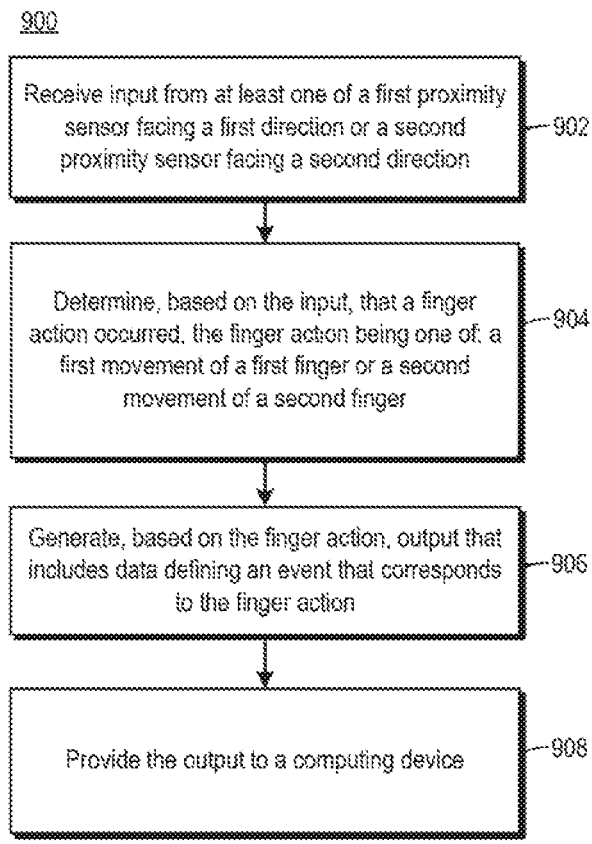
FIG. 9 is a flowchart of another example method for detecting finger movements.

FIG. 9 is a flowchart of another example method 900 for detecting finger movements. The method 900 may be performed by a computing device, such as the data processor and/or microcontroller described in FIG. 3. Other computing devices may also be used to execute method 900. Method 900 may be implemented in the form of executable instructions stored on a machine-readable storage medium, such as fie storage mediums 155 and 320 and/or in the form of electronic circuitry.

Input is received from at least one of a first proximity sensor facing a first direction or a second proximity sensor facing a second direction (902). For example, the first direction of the first proximity sensor may face a user's index finger, and the input may be a distance measurement indicating the distance between the user's index finger and the proximity sensor.

Based on the input, a determination is made that a finger action occurred, the finger action being one of: a first movement of a first finger, detected by the first proximity sensor; or a second movement of a second finger, detected by the second proximity sensor (904). For example, the finger action may be a lift and/or press of the users index finger, e.g., based on distance(s) between the user's index finger and the first proximity sensor.

In some implementations, input may also be received from an accelerometer, which may also be used to determine that a finger action has occurred. For example, input from an accelerometer may be used in implementations where input from multiple sensors are used to determine the probability of a particular finger movement occurring.

Based on the finger action, output is generated that includes data defining an event that corresponds to the finger action (906). In implementations where finger movements are interpreted as mouse pointer actions, e.g., left-click, right-click, and two-dimensional pointer movements on a traditional computer mouse, the event may specify a left-click, right-click, pointer translation, or any other event associated with a mouse pointer.

The output is provided to a computing device (908). For example, output specifying a left-click event may be transmitted to a personal computer. The manner in which the output is handled by computing devices may vary, e.g., depending upon the type of output, computing device, and/or software running on the computing device. Mouse click and movement events for use as pointer input is one example use of the method 900, and the method 900 may be used tor providing other types of event data associated with finger movements.

The foregoing disclosure describes a number of example implementations for determining finger movements. As detailed above, examples provide a mechanism for determining movements of a user's finger and providing data that corresponds to the finger movements to a computing device.

We claim:

1. A ring-shaped wearable device for detecting finger movements, the wearable device comprising:
    a ring-shaped frame defining a space to receive a wearing finger;
    an accelerometer coupled to the frame;
    a first proximity sensor coupled to the frame at a first position and facing a first direction, the first proximity sensor to detect proximity of a first finger on a first side of the wearing finger to the first proximity sensor;
    a second proximity sensor coupled to the frame at a second position and facing a second direction different than the first direction, the second proximity sensor to detect proximity of a second finger on a second side of the wearing finger opposite the first side of the wearing finger to the second proximity sensor;
    a two-dimensional displacement sensor coupled to the frame at a third position and facing a third direction, the third position being between the first position and the second position;
    a wireless communications transmitter coupled to the frame; and
    a data processor coupled to the frame, the data processor being operable to:
        receive input from the accelerometer, the first proximity sensor, the second proximity sensor, and the two-dimensional displacement sensor;

generate a first output based on a first movement of the first finger detected by the first proximity sensor, the first output indicating selection of a first key of a virtual keyboard;

generate a second output based on a second movement of the second finger detected by the second proximity sensor, the second output indicating selection of a second key of the virtual keyboard, the second key different than the first key; and cause the wireless communications transmitter to transmit the first output and the second output.

2. The wearable device of claim 1, wherein:
the first proximity sensor includes a first infrared emitter and a first infrared detector to detect proximity of the first finger to the first proximity sensor; and
the second proximity sensor includes a second infrared emitter and a second infrared detector to detect proximity of the second finger to the second proximity sensor.

3. The wearable device of claim 1, wherein the two-dimensional displacement sensor is an optical sensor to detect two-dimensional movements relative to a surface.

4. The wearable device of claim 1, wherein the accelerometer is a multi-axis accelerometer to detect movements of the wearing finger.

5. The wearable device of claim 1, wherein the accelerometer is to detect movements of the wearing finger.

6. The wearable device of claim 1, wherein the first direction is opposite the second direction.

7. The wearable device of claim 1, wherein the first output and the second output are further based on a location of the frame relative to a surface as detected by the two-dimensional displacement sensor.

8. The wearable device of claim 7, wherein, if the frame is detected as being in a first location relative to the surface, the first key and the second key are selected from a first set of keys from the virtual keyboard, and if the frame is detected as being in a second location relative to the surface, the first key and the second key are selected from a second set of keys from the virtual keyboard, the second set of keys different than the first set of keys.

9. The wearable device of claim 1, wherein the data processor is to generate a third output based on a third movement of the wearing finger detected by the accelerometer, the third output indicating selection of a third key of the virtual keyboard, the third key different than the first and second keys.

10. The wearable device of claim 9, wherein the third key is between the first and second keys on the virtual keyboard.

11. A wearable device for detecting finger movements, the wearable device comprising:
a frame defining a space for receiving a wearing finger;
a hardware processor; and
a storage medium storing instructions that, when executed by the hardware processor, cause the hardware processor to:
receive a first input from a first proximity sensor coupled to the frame at a first position and facing a first direction, the first proximity sensor to detect movement of a first finger adjacent a first side of the frame;
receive a second input from a second proximity sensor coupled to the frame at a second position and facing a second direction different than the first direction, the second proximity sensor to detect movement of a second finger adjacent a second side of the frame opposite the first side of the frame;

determine, based on the first input, that a first finger action occurred, the first finger action being a first movement of the first finger detected by the first proximity sensor, the first finger action corresponding to selection of a first key of a virtual keyboard;
determine, based on the second input, that a second finger action occurred, the second finger action being a second movement of the second finger detected by the second proximity sensor, the second finger action corresponding to selection of a second key of the virtual keyboard different than the first key;
generate, based on the first finger action, a first output specifying the selection of the first key;
generate, based on the second finger action, a second output specifying the selection of the second key; and
provide the first output and the second output to a computing device.

12. The wearable device of claim 11, wherein the instructions further cause the hardware processor to:
receive additional input from at least one of:
an accelerometer coupled to the frame; or
a two-dimensional displacement sensor coupled to the frame at a third position and facing a third direction, the third position being between the first position and the second position;
determine, based on the additional input, that a third finger action occurred, the third finger action being one of:
a third movement of the wearing finger, the third movement being detected by the accelerometer; or
a displacement of the wearable device relative to a surface, the displacement being detected by the two-dimensional displacement sensor;
generate, based on the third finger action, a third output corresponding to the third finger action; and
provide the third output to the computing device.

13. The wearable device of claim 12, wherein the additional input indicates a measure of displacement between a first surface location and a second surface location, and wherein the instructions, when executed by the hardware processor, cause the hardware processor to determine that the third finger action occurred in response to determining that the measure of displacement meets a displacement threshold.

14. The wearable device of claim 11, wherein the first input indicates a first measure of distance between the first finger and the first proximity sensor, and wherein the instructions, when executed by the hardware processor, cause the hardware processor to determine that the first finger action occurred in response to determining that the first measure of distance meets a distance threshold.

15. A method for detecting finger movements, the method comprising:
determining, by a hardware processor coupled to a ring-shaped frame to be worn on a wearing finger, a first position of the frame relative to a surface;
determining, by the hardware processor, that a first finger movement occurred, based on a first distance meeting a first distance threshold, the first distance being measured by a first proximity sensor coupled to the frame, the first proximity sensor to measure distance between a first finger adjacent the wearing finger and the first proximity sensor;
determining, by the hardware processor, that a second finger movement occurred based on a second distance meeting a second distance threshold, the second distance being measured by a second proximity sensor coupled to the frame, the second proximity sensor to measure distance between a second finger, different than the first finger, adjacent the wearing finger and the second proximity sensor;

determining, based on the first position and the first finger movement, a first event associated with the first finger movement, the first event being selection of a first key of a virtual keyboard;

determining, based on the first position and the second finger movement, a second event associated with the second finger movement, the second event being selection of a second key of the virtual keyboard; and providing a computing device with data indicating the first event associated with the first finger movement and the second event associated with the second finger movement.

16. The method of claim 15, wherein the first position is determined based on input received from a two-dimensional displacement sensor coupled to the frame.

17. The method of claim 16, wherein:
the first position corresponds to a first keyboard position of a plurality of keyboard positions for the virtual keyboard;
the first keyboard position corresponds to a first set of keys; and
the first key of the virtual keyboard is included in the first set of keys.

18. The method of claim 17, wherein the second key of the virtual keyboard is included in the first set of keys.

19. The method of claim 17, wherein the input is a first input, further including:
determining, by the hardware processor and based on second input received from the two-dimensional displacement sensor, that the frame is positioned at a second keyboard position of the plurality of keyboard positions for the virtual keyboard, the second keyboard position corresponding to a second set of keys;

determining, by the hardware processor, that a third finger movement occurred;

determining, based on the second keyboard position and the third finger movement, a third event associated with the third finger movement; and providing the computing device with data indicating the third event associated with the third finger movement.

20. A non-transitory machine-readable storage medium comprising instructions that, when executed by a hardware processor, cause the hardware processor to at least:

receive a first input from a first proximity sensor coupled to a ring-shaped frame and facing a first direction away from a center of the ring-shaped frame, the first proximity sensor to detect movement of a first finger relative to the first proximity sensor;

receive a second input from a second proximity sensor coupled to the ring-shaped frame and facing a second direction away from the center of the ring-shaped frame, the second proximity sensor to detect movement of a second finger relative to the second proximity sensor;

determine, based on the first input, that a first movement of the first finger occurred;

determine, based on the second input, that a second movement of the second finger occurred;

generate a first output corresponding to the first movement of the first finger, the first output indicating selection of a first key of a virtual keyboard;

generate a second output corresponding to the second movement of the second finger, the second output indicating selection of a second key of the virtual keyboard, the second key different than the first key; and provide the first output and the second output to a computing device.

* * * * *

UNITED STATES PATENT AND TRADEMARK OFFICE
CERTIFICATE OF CORRECTION

| | | |
|---|---|---|
| PATENT NO. | : 10,310,632 B2 | Page 1 of 1 |
| APPLICATION NO. | : 15/535815 | |
| DATED | : June 4, 2019 | |
| INVENTOR(S) | : S M Shahriar Nirjon et al. | |

It is certified that error appears in the above-identified patent and that said Letters Patent is hereby corrected as shown below:

In the Drawings

In sheet 4 of 9, reference numeral 336, Line 2, delete "SECONDOUTPUT" and insert -- SECOND OUTPUT --, therefor.

Signed and Sealed this
Eighth Day of October, 2019

Andrei Iancu
*Director of the United States Patent and Trademark Office*